United States Patent [19]
Taue et al.

[11] Patent Number: 6,079,378
[45] Date of Patent: Jun. 27, 2000

[54] SUCTION DEVICE FOR A SUPERCHARGED ENGINE

[75] Inventors: Jun Taue; Nobuo Norimatsu, both of Iwata, Japan

[73] Assignee: Yamaha Hatsudoki Kabushiki Kaisha, Iwata, Japan

[21] Appl. No.: 08/836,398

[22] PCT Filed: Aug. 30, 1996

[86] PCT No.: PCT/JP96/02483

§ 371 Date: Jul. 14, 1997

§ 102(e) Date: Jul. 14, 1997

[87] PCT Pub. No.: WO97/09521

PCT Pub. Date: Mar. 13, 1997

[30] Foreign Application Priority Data

Sep. 1, 1995 [JP] Japan ................................ 7-225242

[51] Int. Cl.$^7$ .................................................. F02B 29/00
[52] U.S. Cl. .................................. 123/65 BA; 123/559.1
[58] Field of Search .......................... 123/559.1, 197.3, 123/65 BA

[56] References Cited

U.S. PATENT DOCUMENTS

| | | | |
|---|---|---|---|
| 4,445,336 | 5/1984 | Inoue et al. | 123/559.1 |
| 4,932,368 | 6/1990 | Abe et al. | 123/559.1 |
| 5,121,733 | 6/1992 | Goto et al. | 123/559.1 |
| 5,427,078 | 6/1995 | Hitomi et al. | 123/559.1 |
| 5,429,100 | 7/1995 | Goto et al. | 123/559.1 |
| 5,509,394 | 4/1996 | Hitomi et al. | 123/559.1 |

*Primary Examiner*—Marguerite McMahon
*Attorney, Agent, or Firm*—Knobbe, Martens, Olson & Bear LLP

[57] ABSTRACT

In constructing a suction device for a crank chamber supercharged engine 1 wherein intake air pressurized by a supercharge mechanism is supplied to a combustion chamber, it is arranged that the supercharge mechanism and the combustion chamber are communicatively interconnected by suction passage 38, 46, with an intake valve 7 disposed open/close operably at a downstream end of the suction passage 46, the intake valve 7 being adapted to close between 70 and 100 degrees after a bottom dead center.

2 Claims, 6 Drawing Sheets

500,079,378

SUCTION DEVICE FOR A SUPERCHARGED ENGINE

TECHNICAL FIELD

The present invention relates to a suction device for a supercharged 4-cycle engine having a supercharge mechanism.

BACKGROUND ART

There has been proposed a supercharged 4-cycle engine, for example, such that a connecting rod housing chamber surrounded by a crank chamber, a crank web, and a piston is partitioned by a connecting rod into a suction chamber and a compression chamber so that the air sucked through the rocking of the connecting rod is compressed to be supercharged into the combustion chamber (see Japanese Patent Application Laid-Open No. 6,93869).

A suction device for such a supercharged engine has been known such that a chamber having a comparatively large capacity is communicatively connected to the compression chamber, the chamber and the combustion chamber being communicatively interconnected by a suction passage, with a carburetor disposed in the suction passage. This chamber is to store pressurized air therein thereby to inhibit an air pressure drop during a suction stroke so as to enhance the efficiency of charging. Conventionally, the capacity of the chamber has been set as large as possible, even on the order of, for example, more than 20 times the quantity of engine displacement.

However, when such a supercharged engine is employed in, for example, a small-size vehicle, such as automotive two-wheel vehicle, one problem is that it is difficult to secure necessary space for disposition of such a large-capacity chamber.

Another problem is that, in the case of a supercharged engine of the above mentioned type, if the supercharged pressure is increased when the compression ratio is set at a usual level, there will occur knocking such that the output of the engine does not go up even if the quantity of the mixture is increased.

This invention has been made in view of the foregoing situation of the art and has as its object the provision of a suction device for a supercharged engine which can prevent knocking when the engine is equipped with a supercharge mechanism and can realize a size reduction to enable use in a small type vehicle.

DISCLOSURE OF THE INVENTION

The invention of claim 1 presents a suction device for a supercharged engine wherein intake air pressurized by a supercharge mechanism is supplied to a combustion chamber, characterized in that where the capacity of a suction passage communicatively interconnecting the supercharge mechanism and the combustion chamber is V and displacement is V0, V/V0 is set within the range of from 1 to 20 and in that an intake valve for opening and closing a combustion chamber opening at a downstream end of the suction passage is closed within the range of from 70 to 100 degrees after a bottom dead center.

When the "displacement" of the combustion chamber (V0) is referred to in this specification and the claims, the term "displacement" is used in the normal sense applied in referring to engine capacity or size. That is, the displacement of a single cylinder is the volume displaced by the piston during a complete stroke of operation. Thus, if a cylindrical bore is employed, the displacement is equal to $\pi D \div 4 \times S$ where D equals the diameter of the cylinder bore and S equals the stroke of the piston.

The invention of claim 2 is characterized in that in the invention of claim 1 the cross-sectional area of the suction passage is generally uniform over the entire length of the passage.

In the invention of claim 2, the expression "the cross-sectional area is generally uniform" means that the passage has no part which positively functions as a storage chamber for pressurized air. The time for closing the intake valve may be fixed within the above angular range, or may be variable within and outside the angular range.

BEST MODE FOR CARRYING OUT THE INVENTION

The mode in which the present invention is carried out will now be described with reference to the accompanying drawings.

Figure 1:
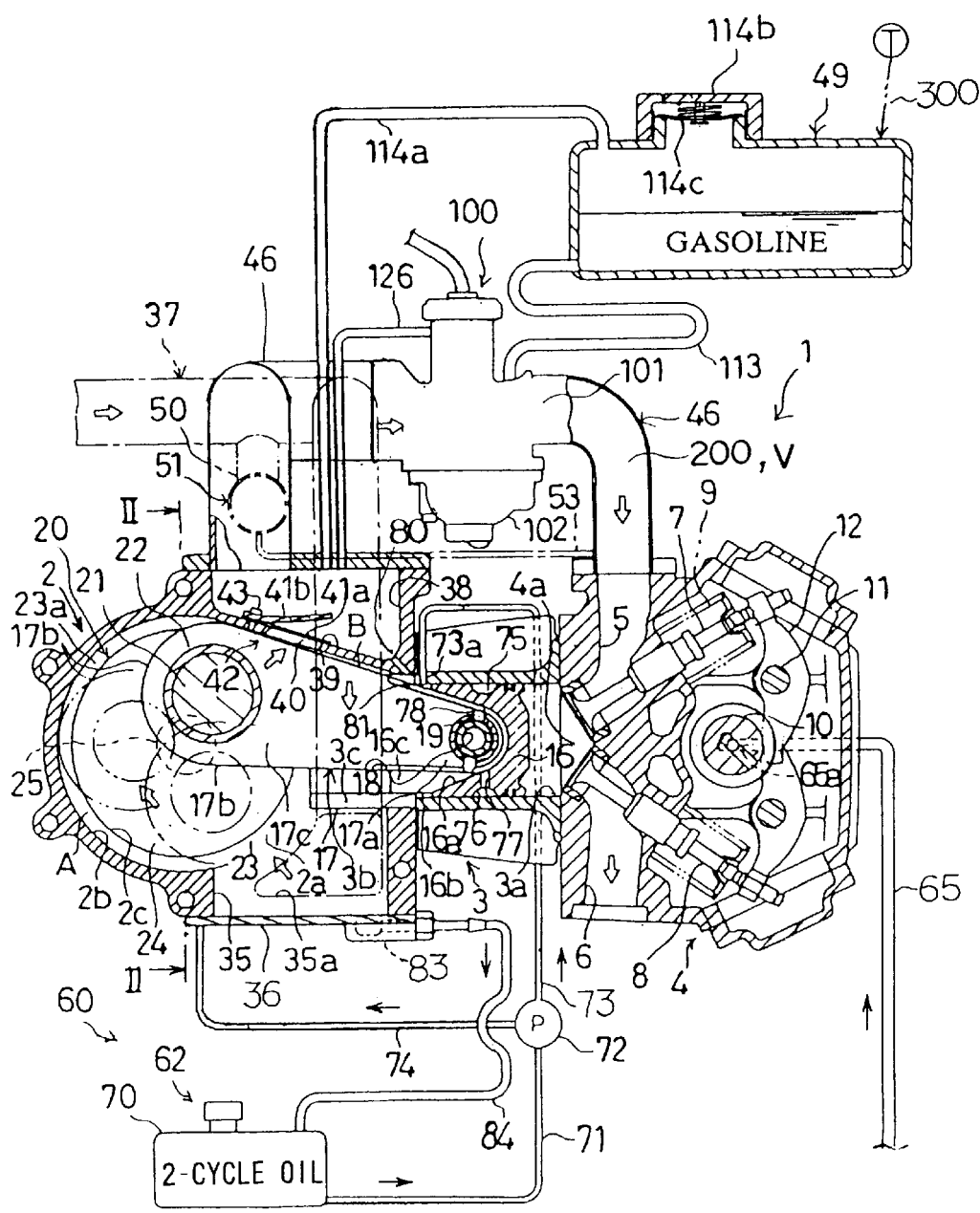
FIG. 1 is a sectional side view for explaining a suction device for a supercharged 4-cycle engine which represents one embodiment of the invention.
Figure 2:
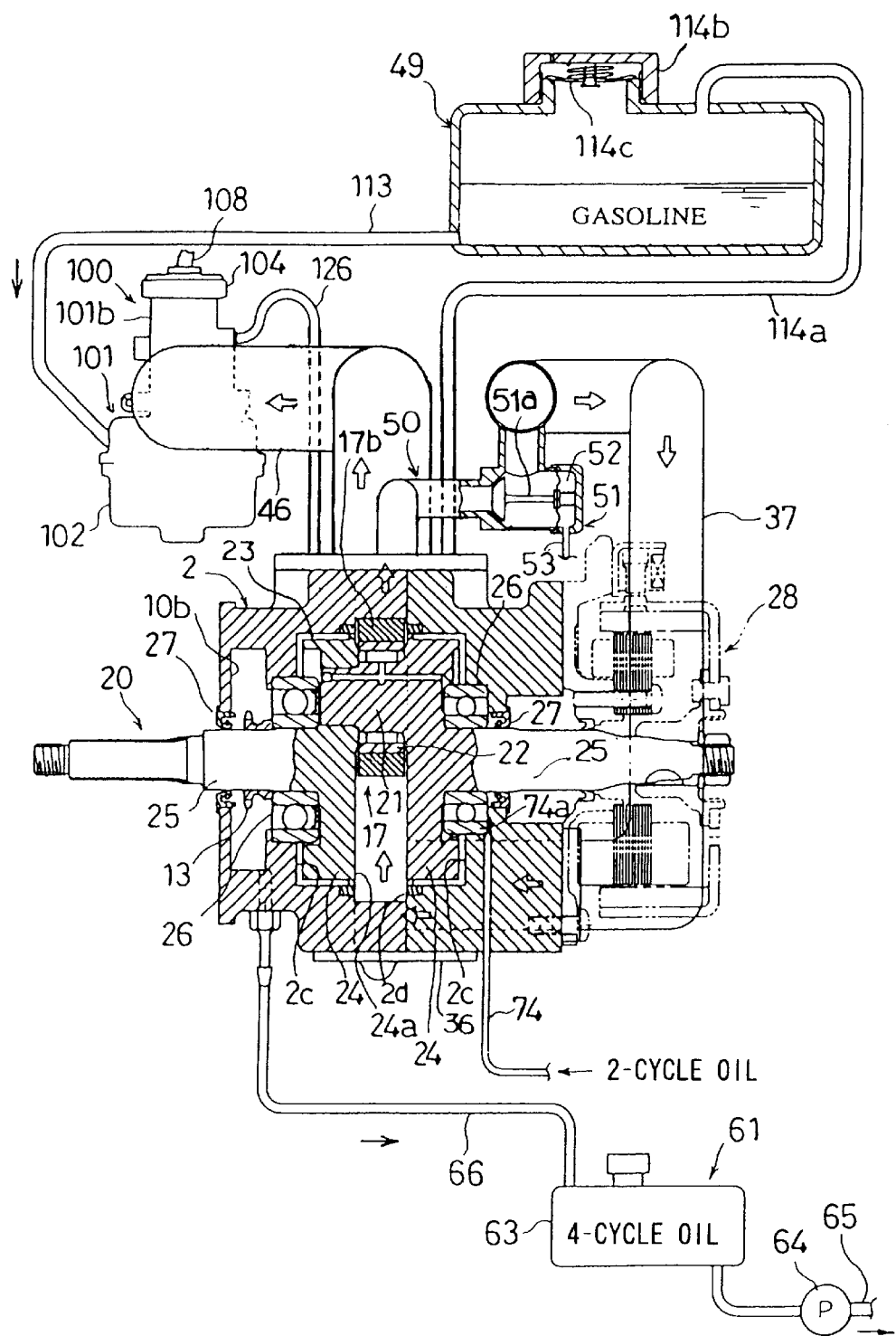
FIG. 2 is a sectional rear view (a section taken on line II—II in FIG. 1) showing a crank shaft portion of the engine representing the above embodiment.
Figure 3:
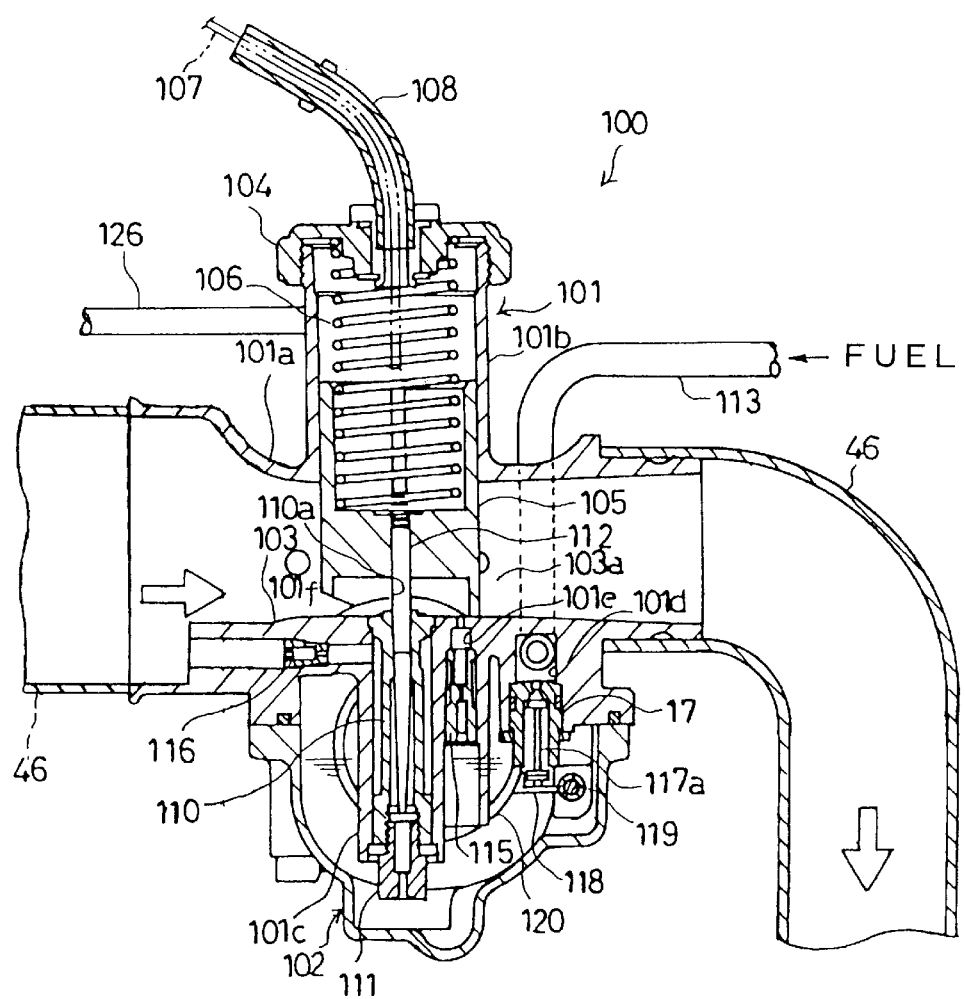
FIG. 3 is a sectional side view of a carburetor in the above embodiment.
Figure 4:
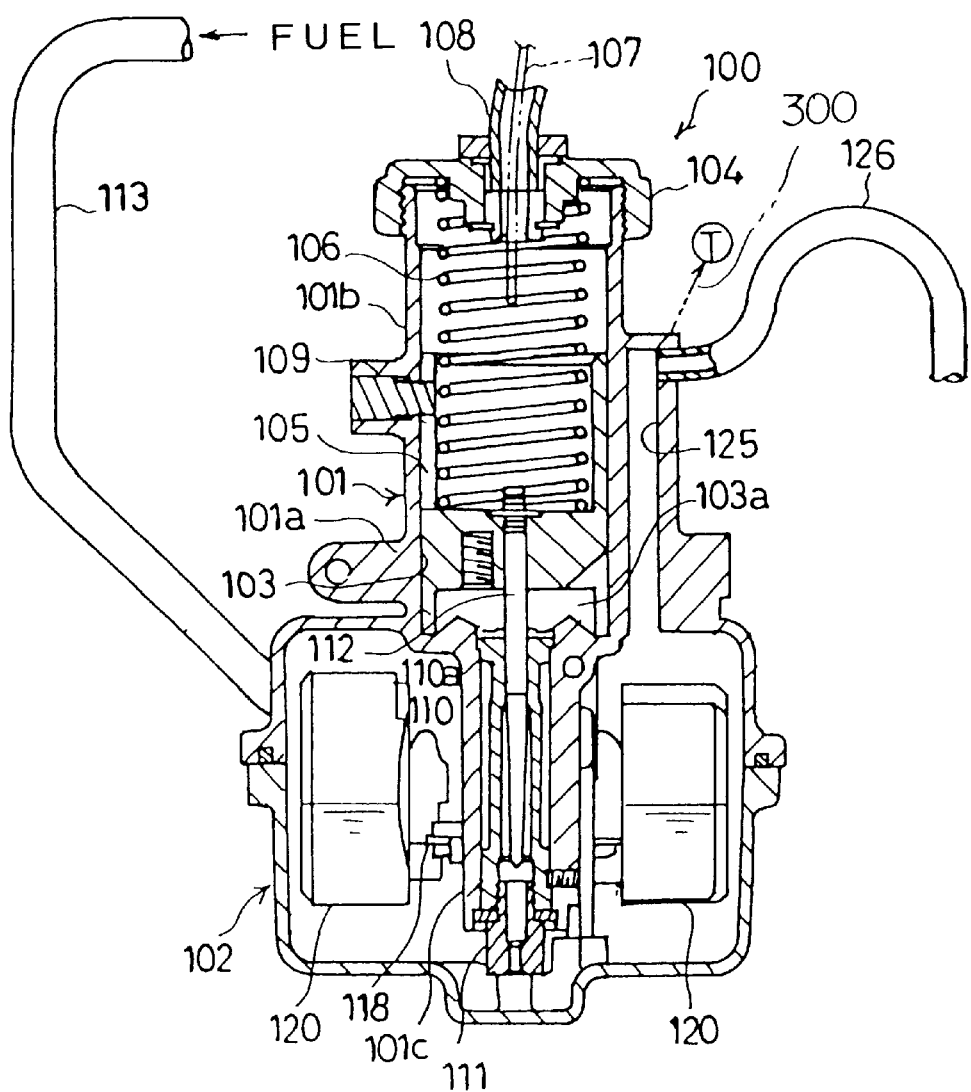
FIG. 4 is a sectional rear view of the carburetor of the above embodiment.
Figure 5:
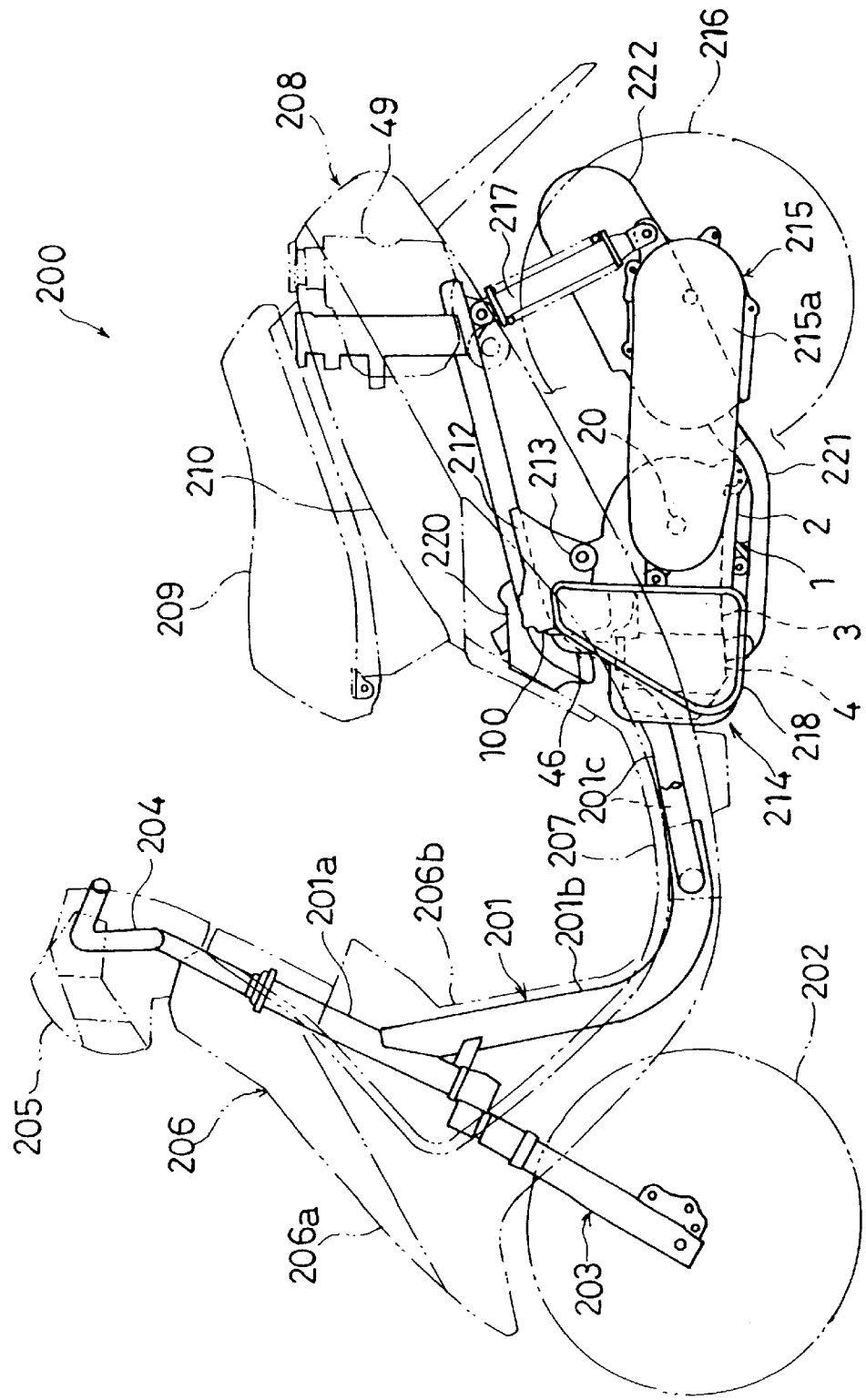
FIG. 5 is a side view of a scooter type automotive 2-wheel vehicle in which the engine of aforesaid embodiment is employed.
Figure 6:
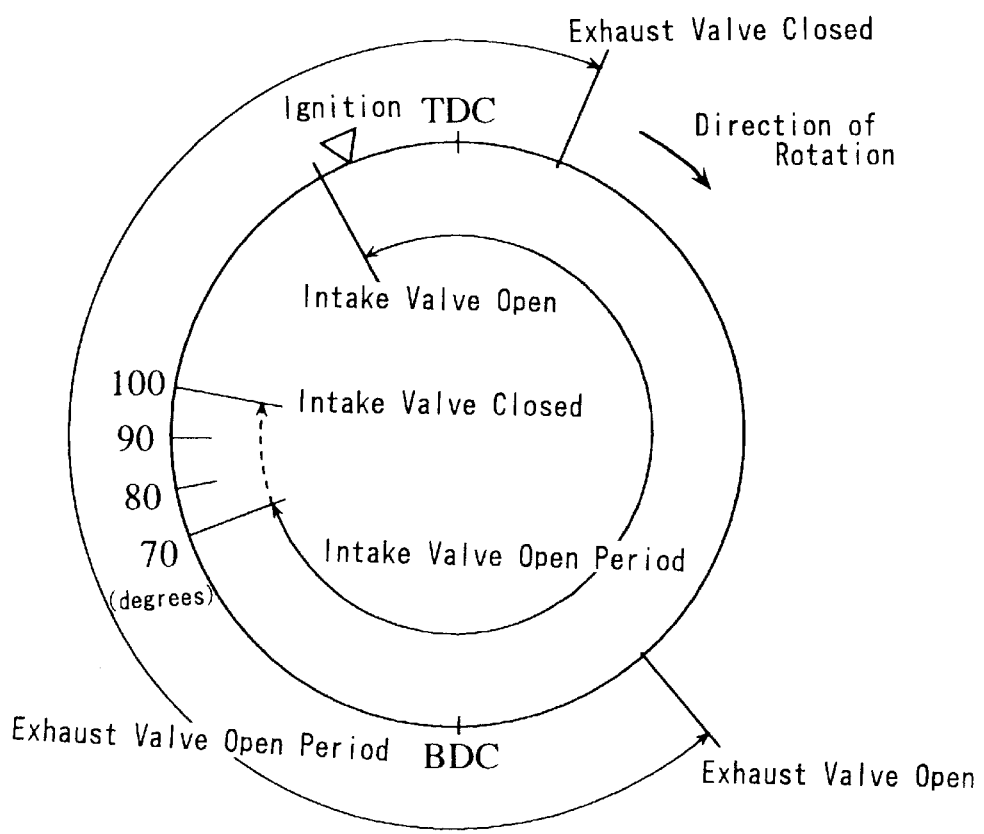
FIG. 6 is a time chart showing times for valve operations in the engine of the embodiment.

FIGS. 1 through 6 are views for explaining a suction device for a 4-cycle supercharged engine according to one embodiment of the present invention, in which FIG. 1 is a sectional side view of the engine representing the embodiment; FIG. 2 is a section taken on line II—II in FIG. 1; FIGS. 3 and 4 are a sectional side view and a sectional rear view respectively of a carburetor portion; FIG. 5 is a side view of a scooter type automotive two-wheel vehicle carrying the engine of the embodiment; and FIG. 6 is a time chart for valve operation times. In the present embodiment, the words "left" and "right" mean left and right as viewed in the direction of forward movement of the vehicle.

In the drawings, reference numeral 200 designates a scooter type automotive 2-wheel vehicle which includes a body frame 201 of the underbone type comprising a main frame 201b having an L-shaped configuration as viewed in side elevation, the upper end of which is connected to a head pipe 201a, a pair of side frames 201c, 201c, right and left, connected at front ends thereof to the lower end of the main frame 201b, thereby the side frames 201c being slanted up, the rear ends of the side frames being extended rearward. A front fork 203 at the lower end of which a front wheel 202 is rotatably supported is laterally controllably supported on the head pipe 201a. A steering handlebar 204 is fixed to the upper end of the front fork 203.

The steering handlebar 204 is covered around it with a handle cover 205, and the head pipe 201a is covered around it with a front cover 206 of 2-split construction consisting of a front cover 206a and a rear cover 206b. A foot board 207 which constitutes a foot mount is provided at junction between the main frame 201b and the side frames 201c, and side covers 208, right and left, are provided alongside the side frames 201c. A sheet 209 is placed on the side covers 208 each, and below the sheet 209 there are mounted a store box 210 and a fuel tank 49 in position.

A unit swing type engine unit 214 is mounted adjacent a location below the sloped-up portions of the right and left side frames 201c. This engine unit 214 comprises an engine body 1 to be hereinafter described which is vertically pivotally supported in suspension by a pivot shaft 213 mounted between the side frames 201c through the intermediary of a suspension bracket 212, and a rear wheel transmission gear 215 formed integrally with and in continuation to the engine body 1 at the left side thereof for rearward extension. The transmission gear 215 incorporates a belt-drive type nonstep variable speed gear (not shown) therein, and at a rear end portion of the gear a rear wheel 216 is rotatably supported. A rear cushion 217 is rotatably supported at its lower end on the top of a rear end portion of a transmission case 215a of the rear wheel transmission gear 215, the upper end of the rear cushion 217 being rotatably supported by the side frame 201c.

An air cleaner 218 is disposed in a corner portion defined by a left side wall of the engine body 1 and a front wall of the transmission case 215a, the air cleaner 218 being securely bolt-fastened to both the engine body 1 and the transmission case 215a. The air cleaner 218 is pivotally movable in association with the engine unit 214. Therefore, no relative movement occurs between the two 218 and 214. This eliminates the need for flexibility in communicatively connecting the two and can provide for simplicity in construction. The air cleaner 218 may be disposed on the top of the transmission case 215a or on the top of the engine body 1. An oil tank 220 is mounted at right side of the engine body 1 and a carburetor 100 on the top of the engine body 1. Further, an exhaust pipe 221 is connected to the underside of the engine body 1, the rear end of the exhaust pipe 221 being connected to a muffler 222 disposed on the right side of the rear wheel 216.

Next, the engine body 1 in the present form of application will be explained in detail.

The engine body 1 is a 4-cycle single cylinder supercharged cylinder with a crank shaft laterally disposed. An air cooled cylinder block 3 is connected to a front mating surface of the crankcase 2 of the engine 1, and a cylinder head 4 is connected to a front mating surface of the cylinder block 3. A portion of the front mating surface of the cylinder head 4 which is opposed to a cylinder bore 3a is recessed to form a combustion recess 4a which constitutes the combustion chamber, with an ignition plug not shown being inserted in the recess 4a.

An intake port 5 and an exhaust port 6 are open in the combustion recess 4a of the cylinder head 4, the intake port 5 and exhaust port 6 being drawn to an upper wall side and a lower wall side respectively of the cylinder head 4. An intake valve 7 is open/close operably disposed in the combustion chamber opening of the intake port 5, and an exhaust valve 8 is open/close operably disposed in the combustion chamber opening of the exhaust port 6. The intake valve 7 and the exhaust valve 8 are biased by a valve spring 9 in the direction of closing movement.

In the cylinder head 4, a cam shaft 10 which acts as an actuation mechanism for open/close actuating the valves 7, 8 are disposed in a direction perpendicular to the surface of the drawing sheet. One end of the cam shaft 10 is connected to a sprocket 13 (see FIG. 2) joined with a crank shaft 20 to be described hereinafter, through a sprocket and a chain not shown, and the cam shaft 10 is decelerated to one half of the rotational speed of the crank shaft 20. On the upper and lower sides of the cam shaft 10 there are disposed a pair of rocker shafts 11, 11 extending in parallel therewith. Respective rocker shaft 11 has a rocker arm 12 pivotally mounted thereto. One end of the rocker arm 12 abuts a cam nose of the cam shaft 10, and the other end abuts the upper ends of the intake and exhaust valves 7, 8.

The configuration of the intake cam nose is designed so that the intake valve 7 is opened 10 to 15 degrees prior to the top dead center of piston 16 and is closed within the range of 70 to 100 degrees after the bottom dead center. The configuration of the exhaust cam nose is designed so that the exhaust valve 8 is opened 40 to 60 degrees prior to the bottom dead center and is closed 10 to 20 degrees after the top dead center. The timing for ignition is set at 5 to 25 degrees before the top dead center.

The piston 16 is slidably disposed in a cylinder bore 3a of the cylinder block 3. With this piston 16 as a boundary, a crank chamber 23 is defined by the combustion chamber, the cylinder bore 3a opposite thereto, and the crank case 2. A smaller end 17a of the connecting rod 17 is connected to the piston 16 through a piston pin 18 and a bearing 19, and a larger end 17b of the connecting rod 17 is connected to a crank pin 21 of the crank shaft 20 through a bearing 22.

The crank shaft 20 is housed in a crank case compartment 23a of the crank chamber 23 and includes a pair of crank webs 24 connected together by the crank pin 21, and a journal 25 integrally formed with each crank web 24, the journal 25 being supported by the crank case 2 through a journal bearing 26. The journal 25 projects outwardly from the crank case 2, and has another projection on which a generator 28 is mounted. Shown by 27 is an oil seal.

Inner side walls 2a, right and left, of the crank case 2 which cross the crank shaft 20 of the crank case 2 at right angles are flush with notches 3c formed, as shown, above and below the engagement portion 3b of the cylinder block 3 relative to the crank case 2. Sides 17c, right and left, of the connecting rod 17 are in slide contact with these inner side walls 2a, right and left, and notches 3c with a minute clearance, and the outer periphery of the larger end portion 17b of the connecting rod 17 are in slide contact with the arcuate inner periphery 2b of the crank case 2 which is so formed as to surround the crank shaft 20, such slide contact being held with a very minute clearance. The inner side walls 2a, right and left, of the crank case 2 are recessed to form circular recesses 2c in which the crank webs 24 are fitted for placement therein, with a very slight clearance provided between respective recess 2a and corresponding crank web 24. Also, on the connecting rod side, side walls 24a are in slide contact with the sides 17c of the connecting rod 17 with a minute clearance. At each respective mouth of the right and left circular recesses 2c, a ring 2d is disposed as fixed to the crank case 2 so that the ring 2d is in contact with or in slide contact with the projecting outer periphery of the crank web 24 but with substantially zero clearance.

Aforesaid rings 2d are made of a material having a higher degree of hardness or higher resistance to wear as compared with the crank case.

A skirt portion of the piston 16 is formed with a triangular recess 16a, and on the outer periphery of the skirt there is formed a notch 16b opposite to the recess 16a. The smaller end portion 17a of the connecting rod 17 is fitted in the recess 16a. The inner periphery of the recess 16a is held in slide contact with the outer periphery of the smaller end portion 17a, and the sides 16c, right and left, of the recess 16a are held in slide contact with the sides 17c, right and left, such slide contact being held with a minute clearance.

Through the above described arrangement, a portion which is surrounded by the crank chamber 23, crank web 24, and piston 16 constitutes a connecting rod housing chamber. In angular crank positions except where the piston 16 is positioned adjacent the top dead center, the connecting rod 17 fits in the space between the inner side walls 2a, right and left, of at least one of the crank cases 2, upper and lower, or in the notch 3c of the cylinder block 3, the connecting rod housing chamber being partitioned into a suction chamber A and a compression chamber B by the connecting rod 17. When the piston 16 is positioned at the top dead center, there is no fitting engagement between the connecting rod 17 and the inner side walls 2a, 2a, right and left, but the skirt end of the piston 16 substantially coincides with the end of the cylinder bore 3a, so that the division between the suction chamber A and the compression chamber B as defined by the piston rod 17 is maintained. In this way, as the crank shaft 20 rotates clockwise from the state in which the piston 16 is positioned at the top dead center, as FIG. 1 shows, the connecting rod 17 moves to the chain line position, then to the chain double-dashed line position, and then to the solid line position, so that the capacity of the suction chamber A is increased to allow air suction and the capacity of the compression chamber is decreased so that the air taken in during the previous stroke is compressed. Thus, a capacity-type supercharger configuration is formed. Such a construction is disclosed in detail in the above cited Japanese Patent Application Laid-Open No. 6-93869.

On the underside of the crank case 2 there is formed integrally therewith a suction passage 35 communicating with the suction chamber A which is open downward. On the foreground-side wall surface of the suction passage 25 in FIG. 1 there is formed an intake port 35a in manner as oriented toward the crank shaft. The intake port 35a is connected to the downstream end of suction pipe 37. The suction pipe 37 passes along a side of the engine and extends outward. The upstream end of the suction pipe is connected to the air cleaner 218.

On the top of the crank case 2 there is integrally formed therewith a suction passage 38 communicating with the compression chamber B and opening upward, and in the suction passage 38 there is integrally formed therewith a partition wall 39 for separating the passage 38 from the compression chamber B. The partition wall 39 is formed with a valve opening 140 for communicating the suction passage 38 with the compression chamber B. The open area of the valve opening 140 is set to such a size as to enable sufficient reduction of air pressure.

A reed valve 42 for opening and closing the valve opening 140 is disposed on the exterior of the partition wall 39, The reed valve 42 comprises a valve plate 41a made of a light metal material composed mainly of titanium, and a stopper 41b disposed on the lift side and operative to regulate the valve travel of the valve plate 41a. The stopper 41b and valve plate 41a are fixedly bolted together by bolt 43 at one end.

The upstream end of the suction pipe 46 is connected to the suction passage 38, and the downstream end of the suction pipe 46 is connected to the intake port 5 of the cylinder head 4. The suction passage 38 and the suction pipe 37 are in communication with each other through a bypass passage 50. The bypass passage 50 is freely open/close operable by a bypass valve 51. The bypass valve 51 is of such a construction that a valve body 51a is moved to an opening position by the negative pressure within a diaphragm chamber 52. The diaphragm chamber 52 is held in communication with the downstream end of the suction pipe 46 through a negative pressure passage 53. The bypass valve 51 is such that when intake negative pressure is increased in the case of a small throttle travel, for example, the bypass passage is opened by the negative pressure to reduce the pressure within the suction passage 38.

A carburetor 100 is disposed at a midway location on the suction pipe 46. The carburetor 100 is a float chamber 102 operable as a fuel reservoir which is bolt fastened to an underside opening of a cab body 101. The cab body 101 comprises a cylindrical body portion 101a having a venturi passage 103 in which intake air flows, a cylinder portion 101b extending vertically upward from the body portion 101a and open at a venturi portion 103a of the venturi passage 103, and a fuel induction portion 110c extending into the float chamber 102 coaxially with the cylinder portion 101b, all these component members being integrally formed together.

A lid 104 is threadingly attached to a top end opening of the cylinder portion 101b, and a cylindrical variable piston valve 105 with a bottom is axially slidably fitted in the cylinder portion 101b. Between the piston valve 105 and the lid 104 there is disposed a spring 106 for normally biasing the piston 105 in the direction of valve closing. A throttle cable 107 is connected at one end to the piston valve 105, and an extension end of the cable 107 is connected to a throttle grip (not shown) of aforesaid steering handlebar 204 after passing through a guide tube 108 connected to the lid 104. Through the control of the throttle grip the piston valve 105 is caused to move vertically to vary the passage area of the venturi portion 103a between full closing and full open. The cylinder portion 110b is fitted with a detent screw 109 which engages an elongate groove provided in the piston valve 105 and acts as a whirl stop for the piston valve 105.

An air bleed sleeve 110 is fitted in the fuel induction portion 10c, and a fuel discharge port 110a of the sleeve 110 is open beneath the piston 105 in the venturi portion 103a. A main jet 111 is threadingly mounted to the lower end of the air bleed sleeve 110 and is open within the float chamber 102. A needle 112 is back and forth movably inserted in the air bleed sleeve 110, the upper end of the needle 112 extending through the bottom of the piston valve 105 and fixed thereto. As the piston valve 105 moves upward and downward, the needle 112 moves back and forth to vary the effective area of the fuel discharge port 110a thereby to adjust the quantity of fuel sucked into the venturi passage 103.

Downstream of the fuel induction portion 101c there is formed a slow fuel induction portion 101e in which a slow jet 115a is disposed by insertion. Upstream of the fuel induction portion 101c there is formed a bleed air inlet hole 101f which is open toward the suction pipe 46, with an air jet 116 disposed therein through insertion. A side wall of the air bleed sleeve 110 is formed with an air bleed hole not shown.

The cab body 101 is formed with a fuel inlet port 101d which communicates with the interior of the float chamber 102. The inlet port 101d is communicatively connected to one end of a fuel supply hose 113, the other end of the supply hose 113 being communicatively connected to the bottom of a fuel tank 49. The fuel tank 49 is positioned above the carburetor 100 so that fuel is supplied into the float chamber 102 by gravity. A pressure pipe 114a communicatively connected to the suction passage 38 is connected to the ceiling wall of the fuel tank 49 so that a supercharge pressure is applied to the fuel in the fuel tank 49. On a tank cap 114b of the fuel tank 49 there is disposed a relief valve 114c which is adapted to open when a supercharge pressure greater than a predetermined pressure is applied.

Disposed within the float chamber 102 is a float 120 which is vertically pivotally supported by a plate 118 and a support shaft 119. A fuel intake valve 117 is disposed at the fuel inlet port 101d in the float chamber 102, and the lower end of a valve body 117a of the intake valve 117 is held in abutment with and supported by the plate 118. Thus, with changes in the fuel level in the float chamber 102, the float 120 moves upward and downward so that the fuel inlet hole is opened and closed by the valve body 117a whereby the fuel level in the float chamber 102 is maintained constant.

In the cylinder portion 101b of the cab body 101 there is axially formed a pressure passage 125 which extends in the axial direction, the lower end of the pressure passage being open within the float chamber 102. One end of a pressure hose 126 is connected to the upper end of the pressure passage, the other end of the pressure hose 126 is communicatively connected to the interior of the suction passage 38. Thus, the supercharge pressure within the suction passage 38 is applied to the liquid level within the float chamber 102.

In this way, the cab body 101 is provided with a pressure passage 125 which communicates with the float chamber 102, and the pressure passage 125 and the communication passage 38 are kept in communication by the pressure hose 126 with each other, Therefore, even if the pressure in the venturi portion 103a becomes high, a pressure larger than the pressure at the fuel discharge port 110a of the venturi portion 103a can be applied to the fuel surface in the float chamber 102, whereby fuel supply can be stably made. In this case, even if there is any change in the pressure at the discharge port 110a, a pressure corresponding to such pressure change acts on the interior of the float chamber 102. This permits sufficient fuel supply which in turn results in improved engine output and more effective fuel consumption.

The fuel in the fuel tank 49 is supplied by gravity. This, coupled with the fact that supercharge pressure is applied to the interior of the fuel tank, makes it possible that in an operating zone where the supercharge pressure is low, fuel is supplied from the fuel tank into the float chamber 102 in the same manner as in the case of a conventional carburetor type fuel supply device. In the supercharged operation zone, supercharge pressure is applied on both the fuel tank 4 and the float chamber 102. Therefore, good fuel pressure balance can be obtained and, as stated above, fuel is supplied by gravity from the fuel tank 49 to the float chamber 102. In this way, fuel can be supplied to the supercharged engine 1 without use of a fuel pump and/or a special carburetor. This results in cost reduction and mounting space reduction.

Further, the supercharge pressure within the suction passage 38 is applied to the interior of the float chamber 102. This makes it possible to reduce pressure variations and to perform fuel feed in a more stable manner. It is not necessary to constantly pressurize fuel by means of a fuel jet device or the like. Therefore, problems such as time lag in fuel pressure pull-up at the time of starting, and increased power consumption can be solved. Further, in the event of battery discharge, fuel supply can be performed, which serves as effective safety measures.

Numeral 60 designates a lubricating device which comprises a first lubricating system 61 and a second lubricating system 62. The first lubricating system comprises a first reservoir tank 631 loaded with a 4-cycle purpose oil, and an oil supply pipe 65 connected to the reservoir tank, with a supply pump 64 interposed between them, a supply port 65a of the supply pipe 65 being connected to the cam shaft 10 which constitutes a movable valve mechanism of the cylinder head 4. Oil used in lubricating the cam shaft 10 returns to a chain chamber 10b in which above mentioned chain is housed, wherein the oil lubricates driven sprockets and the left side journal bearing 26 (with sealing) in FIG. 2. After lubrication, the oil is collected into the reservoir tank 63 after passing through a collecting pipe 66.

The second lubricating system 62 comprises a second reservoir tank 70 loaded with a 2-cycle purpose oil, and a main supply pipe 71 and a pressure feed pump 72 which are connected to the reservoir tank, and first and second auxiliary supply pipes 73, 74 connected to the pump 72, the first auxiliary supply pipe 73 being connected to the piston slide portion of the cylinder block 3, the second auxiliary pipe 74 being connected to the journal bearing portion of the crank chamber 23.

The pressure feed pump 72, not shown though, is an improvement of an electromagnetic pump which comprises an improved solenoid, the feed pump comprising an armature securely fixed to a push rod of a plunger such that the armature is attracted by the solenoid. Through this arrangement the discharge pressure of the pump 72 is increased so that the pressure overcomes the supercharge pressure to enable oil feed.

The first auxiliary supply pipe 73 extends through a liner portion of the cylinder block 3 in a direction rectangular to the crank shaft 29, and is positioned more adjacent to the crank chamber than the second piston ring of the piston 16 which is located at the bottom dead center. On an external surface more close to the crank chamber than the second piston ring of the piston 16 there are formed two parallel notches in the direction of the crank shaft to define two oil reservoir recesses 75, 76. The recess 75 is lubricated with oil supplied from the discharge port 73 when it coincides with discharge port 73a through the movement of the piston 16, the lubrication being made when the discharge port 73a is closed by the piston 16. The recess 76 is lubricated with oil supplied from the discharge port 73a and accumulated, in manner as described hereinafter, when the discharge port 73a is closed by the piston 16. In this way, any possible trouble can be avoided which may occur in connection with lubrication as a result of the discharge port 73a being closed by the piston 16.

On the outer periphery of the smaller end portion 17a of the connecting rod 17 there is formed an oil guide groove 81 extending circumferentially of the end portion. The piston 16 is formed with a communication hole 77 which communicates with the guide groove 81 and the lower recess 76. On the opposite side of the communication hole 77 there is formed a communication hole which communicates with the piston pin 18 and bearing 19. Through this arrangement, part of the oil in the guide groove 81 which is supplied from the discharge port 73a and the oil collecting hole 80 is supplied from the communication hole 78 to the bearing 19, and part of the remaining oil is supplied from the communication hole 77 to the slide contact surface of the smaller end portion 17a and the piston 16, and further to the recess 76.

The oil discharge port 74a of the second auxiliary supply pipe 74 extends through the crank case 2 until it reaches a journal bearing 26 at the right side as in FIG. 2. The oil supplied to the right journal bearing 26 is supplied to respective inner walls 2a, 2b of the crank case 2, and the clearance between the circular recess 2c and the crank shaft 20, and respective slide surfaces.

The partitioning wall portion 39, at a lower portion of its inclined surface, is formed with a small diameter oil collecting hole 80 which communicates with the suction passage 35. The cover portion 36 attached to a lower portion of the crank case 2 is formed with a collecting passage 83. The collecting passage 83 is connected to a collecting pipe 84 which in turn is connected to the second reservoir tank 70.

Thus, the oil supplied from the first and second auxiliary supply pipes 73, 74 gathers on the upper surface of the cover portion 36 in the suction passage 35 from which the oil is collected. In the present embodiment, the engine 1 is a horizontal type such that the compression chamber having high supercharge pressure is disposed in an upward facing position and air is sucked from below the crank case 2. Therefore, by interaction of gravity and supercharge pressure, lubricating oil gathers in a lowermost portion, which assures accurate collection of oil, thus enabling recycling of the oil. In the crank case 2, with the seal ring of the seal ring-attached bearing 26, at the left side in FIG. 2, as the boundary, the crank chamber 23 side is lubricated by 2-cycle oil and the chain chamber 10b side, including ball portion of the seal ring attached bearing, is lubricated by 4-cycle oil.

Next, the function and effects of the present embodiment will be explained.

In use of the engine 1, each time the crank shaft rotates one turn, the following quantity of air is pressure-fed from the suction passage 38 to the suction pipe 46, namely, volume V2 of the compression chamber B at the moment when the larger end portion of the connecting rod 17 approaches the arcuate peripheral wall of the crank case 2 and just before it begins sliding contact, less a minimum volume V3 of the compression chamber B at the moment when the connecting rod approached most close to the partitioning wall portion. That is, the balance V1 is the quantity of air to be pressure-fed from the suction passage 38 to the suction pipe 46.

The volume V of the suction passage 200 consisting of the intake passage 38, suction pipe 46 adjacent the carburetor 100, venturi passage 103 in the carburetor 100, and suction port 5 is set to be within the range of from 1 to 20 times the quantity of displacement (bore×stroke) V0 by one stroke of piston 16. Thus, when the suction valve 7 is closed at the end of a previous suction stroke, fresh air of volume 2 V1 from the supercharge mechanism is forced into the fresh air retained in the suction passage 200, a space of volume V, and is stored therein. During a succeeding suction stroke in which the intake valve 7 is open, the air in the suction passage 200 enters the combustion chamber. That is, the pressure in the suction passage 200 is increased generally to the order of (2 V1+V)/V. Then, during a suction stroke of the engine 1, the magnetic valve is opened, whereupon two times the quantity of pressure air feed V1 for one turn of the crank shaft 20 is supercharged into the combustion chamber.

The ratio of V1/V0 is intended to be more than 1, and the quantity of fresh air charge due to supercharging is increased (compression ratio is nominally (2V1+VC)/VC, but due to leakage from slide contact portions with which the connecting rod 17 is in slide contact but without contact, such as arcuate peripheral wall 2b and side walls of crank web 24, and also due to a slight degree of back flow at the reed valve, actual value will be smaller than the nominal value) and knocking may occur.

In the present engine 1, the intake valve 7 will close when the crank angle reaches 70–100 degrees from the bottom dead center of the piston 16. Therefore, the compression ratio can be reduced substantially and hence knocking that may otherwise occur in the pressurizing of intake air by the supercharge mechanism can be prevented. If compression ratio only is reduced, there will be no change in the expansion ratio determined by displacement (bore×stroke) and combustion chamber capacity. Therefore, any effect upon fuel consumption and engine output can be avoided.

Since the timing for closing the intake valve is delayed, there may be a fear of blow back of the mixture. However, the capacity V1 of the suction passage 200 is of such a small order of 1 to 20 times the displacement V0, and therefore any such blow back can be inhibited and a substantially same quantity of air charge can be obtained as in the case where the timing for intake valve closing is same as that in the prior art and where the capacity V1 is more than 20 times the displacement V0.

In the present mode of the invention, a large capacity chamber is unnecessary, and therefore it is possible to provide a supercharged engine 1 which is small-sized, compact and light, and which can be employed in a scooter type automotive two-wheel vehicle 200.

Since the timing for closing the intake valve 7 is delayed, and since the air from the supercharge mechanism is directly supplied into the combustion chamber, the intake air is more liable to cool than in the case where the air is supplied through a chamber. Therefore, an intercooler for cooling the pressurized air from the supercharge mechanism is unnecessary, and in this respect, too, the invention can well meet the need for size reduction and more compact construction.

Since the capacity of the suction passage 200 is reduced, the response function in feeding the pressurized air from the supercharge mechanism is improved, and therefore pull-up for acceleration can be prompted so much, resulting in improvement in the acceleration performance. In the case of deceleration, reduction of supercharge pressure is quickly performed, resulting in improved transient characteristics. Furthermore, since a large-capacity chamber is unnecessary, there is no possible retention of fuel from the carburetor 100 and, therefore, the effect of such retention on the mixture ratio is avoided so that engine stop and poor starting can be prevented and any possible damage in the event of back fire can be prevented.

In the foregoing mode of the invention, a 4-cycle, single cylinder crank chamber supercharged engine is described by way of example but, of course, the invention is applicable to engines equipped with a supercharge mechanism of other type than that of the present invention, such as turbocharger or supercharger, and is of course applicable to multi-cylinder engines. In the above described mode, the invention is applied to a scooter type automotive 2-wheel vehicle, but the scope of application of the invention is not limited to such a vehicle and is of course applicable to other kinds of vehicles as well.

INDUSTRIAL APPLICABILITY

As described above, in the suction device for supercharged engine according to the invention claimed in claim 1, the suction valve is closed in the angular range of 70 to 100 degrees after the bottom dead center and, therefore, only compression ratio can be reduced without changing the expansion ratio as determined by borexstrokes and capacity of the combustion chamber, knocking can be prevented, and waste in fuel consumption can be prevented.

Where the timing for closing the suction valve is delayed, sucked air flowing into the combustion chamber is liable to blow back into the suction passage. In the present invention, however, the capacity of the suction passage is set within the range of 1 to 20 times the quantity of displacement, that is, there is no part which positively functions as a pressurized air storage chamber, such flow back can be inhibited, and the timing for closing the suction valve can be maintained at a level similar to that in the prior art, it being thus possible to secure such a substantially same quantity of air charge as is available from a device having a large capacity of suction passage.

Where the need for chambers is eliminated, it is possible to realize reduction in size of the supercharged engines as a whole, and to enable application of the invention to small size vehicles.

What is claimed is:

1. A crankcase supercharged engine comprised of a cylinder having a cylinder bore with a crankcase chamber formed at one end thereof, a piston reciprocating in said cylinder bore, a crankshaft rotatably journalled in said crankcase chamber, a connecting rod coupled to said piston and said crankshaft for transmitting motion therebetween, means for providing a seal between one end of said connecting rod and said piston and between the sides of said connecting rod and the side surfaces of said crankcase chamber, said connecting rod having a portion thereof in sealing engagement with said crankcase during at least a portion of a single rotation of said crankshaft for dividing said crankcase chamber into a pair of variable volume chambers formed by said piston, said cylinder bore, said connecting rod, said crankshaft and said crankcase chamber for acting as a positive displacement supercharger mechanism having two pumping cycles per each revolution of said crankshaft, intake means for admitting an air charge to said crankcase chamber, and a suction passage for discharging a compressed air charge from said crankcase chamber through an intake valve to a combustion chamber formed at least in part by said piston and said cylinder bore, wherein the volumetric capacity of said suction passage is V and displacement of said combustion chamber is V0, the ratio V/V0 being within the range of from 1 to 20, and said intake valve being closed within the range of from 70 to 100 degrees after a bottom dead center position of said piston.

2. A suction device for a supercharged engine as set forth in claim 1, wherein the cross-sectional area of the suction passage is substantially uniform over the the length of said suction passage.

* * * * *